United States Patent [19]

Kark

[11] Patent Number: 4,650,364

[45] Date of Patent: Mar. 17, 1987

[54] ARRANGEMENT FOR FASTENING A ROLL RING ON AN OVERHUNG ROLL SHAFT

[76] Inventor: Uwe Kark, Cuxhavener Str. 60a, 2104 Hamburg 92, Fed. Rep. of Germany

[21] Appl. No.: 606,796

[22] Filed: May 3, 1984

[30] Foreign Application Priority Data

May 4, 1983 [DE] Fed. Rep. of Germany ....... 3316289

[51] Int. Cl.⁴ .............................................. F16B 1/04
[52] U.S. Cl. ..................................... 403/368; 403/31; 403/34; 403/259; 384/549; 384/556; 72/237
[58] Field of Search ................ 384/549, 556; 192/65, 192/93 C; 72/237, 238, 239; 29/110, 113 R, 117; 403/11, 15, 31, 34, 36, 37, 259, 260, 261, 366, 367, 368, 270, 343, 299

[56] References Cited

U.S. PATENT DOCUMENTS

| | | | |
|---|---|---|---|
| 2,574,773 | 11/1951 | Bannister | 403/37 |
| 2,959,258 | 11/1960 | Hagemann | 403/15 |
| 3,404,907 | 10/1968 | Kane et al. | 403/11 |
| 3,514,137 | 5/1970 | Brown et al. | 403/370 |
| 3,616,671 | 11/1971 | Notari | 72/238 |
| 4,208,147 | 6/1980 | Giege et al. | 29/117 |
| 4,391,357 | 7/1983 | Bindernagel | 403/343 X |

FOREIGN PATENT DOCUMENTS

| | | |
|---|---|---|
| 2144711 | 3/1972 | Fed. Rep. of Germany . |
| 2606908 | 3/1977 | Fed. Rep. of Germany . |
| 3143878 | 8/1982 | Fed. Rep. of Germany . |
| 2384593 | 10/1978 | France . |
| 1235088 | 6/1971 | United Kingdom ............. 403/15 |

Primary Examiner—Andrew V. Kundrat
Assistant Examiner—Joseph A. Fischetti
Attorney, Agent, or Firm—Townsend and Townsend

[57] ABSTRACT

An arrangement for fastening a roll ring (5) to an overhung roll shaft (1) by means of a taper sleeve (8) which transmits essentially the entire torque and which is loaded axially by a spring (43) supported on an abutment (47) adjustable on the free end of the roll shaft. The roll ring can be exchanged easily because of a cylinder part (21) arranged radially within the spring. This cylinder part forms a first annular cylinder space (40) for prestressing the spring, with which it interacts via a flange, and a second cylinder space (22) for drawing off the taper sleeve, to which it is connected via engagement means (28). The spring and the hydraulic devices can remain in place when a roll ring is assembled and removed, because their outside diameter is less than the bore of the roll ring.

21 Claims, 1 Drawing Figure

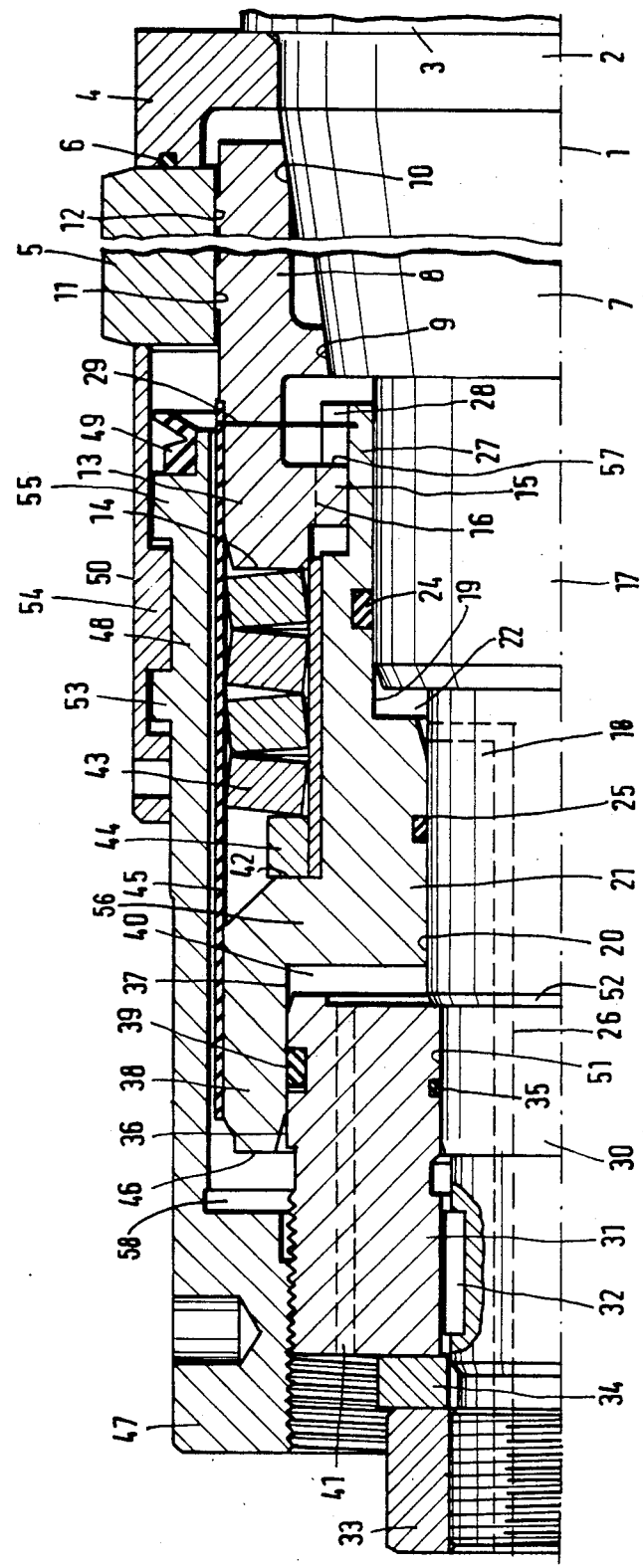

ARRANGEMENT FOR FASTENING A ROLL RING ON AN OVERHUNG ROLL SHAFT

DESCRIPTION

The invention relates to an arrangement for fastening a roll ring to an overhung roll shaft by means of a taper sleeve which transmits essentially the entire torque and which is loaded axially by a spring supported on an abutment.

In a known arrangement of this type (U.S. Pat. No. 2,574,773), the taper sleeve is pressed by means of cup springs, which are themselves supported by a screw located at the end of the roll shaft, between a conical surface of the roll shaft and a conical bore in the opposite direction in the roll ring. The spring force and the cone angles are calculated so that the taper sleeve is, in practice, capable on its own of transmitting the drive torque from the roll shaft to the roll ring. At the same time, the cone angle in the bore of the taper sleeve and in the part of the roll shaft interacting with it is chosen to be large enough to prevent self-locking from occurring, consequently, the taper sleeve can as result of axial displacement yield to the changes in diameter of the roll ring caused by temperature changes. When the roll ring is exchanged, it is necessary to remove the spring and the taper sleeve from the roll shaft before the roll ring can be drawn off. This is complicated and can present difficulties in practice.

It is also known (DE-A No. 3,143,878; FR-A No. 2,384,593) to obtain the torque-transmitting connection between the roll shaft and the roll ring by means of axial clamping of the roll ring, whilst the taper sleeve provided radially between the roll shaft and the roll ring merely serves for centering. As a result, in those cases in which the roll ring consists of a material sensitive to tensile stress (for example, hard metal), the high tensile stresses felt to have an adverse effect, associated with the transmission of torque exclusively via a taper sleeve, will be avoided. A strong spring is provided for exerting the axial pressing force on the roll ring, whilst a relatively weak spring serves for exerting axial force on the taper sleeve. The two springs are supported by the same nut which can be screwed to the free end of the roll shaft. A hydraulic piston/cylinder device is provided for tensioning the springs. These arrangements have, on the one hand, the disadvantage that the axial clamping of the roll ring is not sufficient to absorb the radial rolling forces; these have to be absorbed via the taper sleeve, as result of which the latter has to be tightened very strongly, irrespective of the transmission of the drive torque, if considerable creeping of the roll ring in the peripheral direction under the influence of the roll forces is to be prevented. Then, however, high peripheral stresses of the roll ring are also unavoidable, especially as in known constructions the taper sleeves have a small cone angle which is below the self-locking limit, so that they cannot be reset automatically, to compensate the stresses, after an advance which has been made possible by expansion of the roll ring. Finally, it is a disadvantage that when a roll ring is exchanged the entire arrangement consisting of springs, lock nut and hydraulic devices has to be removed beforehand, that no hydraulic device is provided to make it easier to remove these parts or that such a device has to be attached separately from outside, and that the springs and their pressing surfaces, sensitive to dirt and corrosion as regards uniform transmission of force, are exposed without protection to dirt and corrosion as result of operating influences. The exchange of a roll ring is not only complicated, but also presupposes special expertise of personnel and careful handling of parts belonging to the fastening arrangement.

The object on which the invention is based is to provide a fastening arrangement of the type mentioned in the introduction, which, whilst ensuring a low outlay in terms of construction and a small space requirement, allows secure and careful fastening of the roll ring and a quick and simple exchange of the roll ring, without special demands being made as regards the qualification of personnel and the maintenance of the fastening arrangement.

The solution according to the invention lies in the combination of the following features:

(a) located radially inward of the cup spring is a piston part which forms with the roll shaft two annular spaces acting axially in opposite directions and having separate hydraulic connections;

(b) the piston part has a flange arranged axially between the spring and the abutment;

(c) another radial extension of the piston part communicates with a radial extension of the taper sleeve for releasing the pressure on the roll ring.

Since the hydraulic devices are permanently present within the arrangement both for prestressing the spring and for releasing the taper sleeve, it is sufficient, for their use, if the hydraulic connections are connected to an appropriate pressure-medium source. This is possible quickly and does not presuppose any special expertise. Although the hydraulic devices are contained permanently in the apparatus, they take up a comparatively small amount of space, because they are for the most part arranged radially within the spring region and to that extent use the axial space, which is necessary in any case, for the spring. At the same time, the outlay in terms of construction is comparatively low, because the surface of the roll shaft, present in any case, is used to form the annular spaces. Although it is known per se (DE-A No. 2,144,711), on a roll shaft, to provide at the end of the roll shaft a hydraulic arrangement acting in two opposite directions and comprising two annular cylinders, nevertheless this serves for assembling and removing a bearing arrangement, the hydraulic device acting, during the assembly operation, on an inner bearing shell resting by means of a conical bore on a corresponding conical portion of the shaft, and, during the removal operation, acting on an outer bearing shell which interacts axially via flange projections with the inner bearing shell in order to carry the latter along with it during the action of removal. Since the preconditions as regards construction are substantially different in relation to a bearing from those governing the fastening of a roll ring, the known arrangement could not give any direct teaching as regards the design of a hydraulic device in respect of a fastening arrangement for a roll ring.

Appropriately, the largest outside diameters of the taper sleeve, the spring and the piston part, insofar as these are located on the free side of the roll ring, do not exceed the smallest inside diameter of the roll ring. This allows the roll ring to be assembled and removed without the said parts being detached. This not only means that the exchange of a roll ring becomes much simpler, but also contributes to protecting the sensitive parts of the hydraulics and the spring arrangement and consequently to lenghtening their useful life and to perfect functioning beneficial to the useful life of the roll rings.

The cylinder part preferably has two coaxial bores, the larger of which surrounds in a leak-proof manner an annular piston arranged firmly on the roll shaft, whilst the smaller sealingly surrounds the roll shaft on the side of the annular member facing the spring to form the first annular space, and a nut which can be turned on the free end of the roll shaft or to the annular piston is provided as an abutment for fixing the piston part in its tensioned position. In this regard, the piston part appropriately has, on the side of its smaller bore facing away from the annular member, a further bore sealingly surrounding a thickened part of the roll shaft and serving to form the second annular space.

According to a further feature of the invention, the parts of the taper sleeve and piston part which enclose the spring can be surrounded by a collar which protects them from dirt and the diameter of which is less than the inside diameter of the roll ring. Instead of or in addition to this, the spring, together with the adjoining part of the taper sleeve and of the piston part, can be surrounded by a protective sleeve which is sealed off on the roll ring and which is preferably connected to the abutment designed as a nut.

A precondition for a small diameter of the fastening arrangement to allow convenient assembly and removal of the roll ring is that axial clamping of the roll ring be abandoned and that a return be made to the known fastening arrangement mentioned to the introduction, in which the roll ring is held on the roll shaft solely by means of the taper sleeve and its radial clamping. The associated high stress on the rol ring demands that, when a material sensitive to tensile stress is used for the roll ring, stress peaks, which can be caused as result of production tolerances or contraction of the roll ring after heating, should be avoided with care. It may be advisable, for this purpose, to choose a sleeve cone angle above the self-locking limit, as is known in the arrangement described in the introduction. The stress-limiting effect of this measure is based on the fact that the taper sleeve can, as result of axial movement, yield in response to expansion conditions on the roll ring which are caused by temperature. However, since such movements should be avoided as far as possible because of their wearing effects, it can be appropriate, in connection with the invention, to make the taper sleeve radially resilient (known per se from DE-C No. 2,606,908) and to ensure that the difference in spring force, arising as a result of the axial expansion differences to be expected because of the influence of temperature, is less than the frictional forces between the taper sleeve and the roll shaft. In this combination of features, calculation of the taper cone angle above the self-locking limit, together with a suitable spring tension, ensures that, on the one hand, the radial clamping of the roll ring, necessary for fastening it, never falls below the minimum limit and, on the other hand, no dangerous stress peaks can be reached even in the event of contraction of the roll ring after heating. If, in this respect, the sleeve were radially rigid, then constant axial compensating movements of the taper sleeve and corresponding wear of the highly stressed surfaces sliding on one another would have to be expected, but the radial resilience of the taper sleeve prevents the major part of these movements. Finally, if the spring characteristic were too steep because of the unavoidable axial expansion differences between the roll shaft and the taper sleeve and the other parts transmitting the spring force, alternating spring tension and consequently also axial movements of the sleeve would have to be expected, but these are prevented because the difference in spring force occurring as result of the axial expansion differences is calculated as less than the frictional forces between the taper sleeve and the roll shaft. Since both the frictional forces and the spring forces under different expansion conditions can easily be computed, the design can ensure, on the basis of the above rules of calculation, that axial movements of the taper sleeve to compensate radial or axial expansion differences occur extremely rarely or not at all.

Since the fastening forces exerted on the roll ring can consequently be kept within narrow limits, it has been shown that hard-metal roll rings can be given substantially more economical dimensions than has been customary hitherto. It has been shown, furthermore, that the useful life of the roll rings is lenghtened because the wear on their working surfaces is reduced, and this is obviously attributable to the fact that the quality of fastening is improved in spite of being restricted to an exclusively radial clamping effect.

BRIEF DESCRIPTION OF THE DRAWING

The invention is explained in more detail below with reference to the drawing which illustrates a half-section through the arrangement.

DESCRIPTION OF THE PREFERRED EMBODIMENT

The roll shaft 1 is mounted overhung on the right, outside the region illustrated, in a known way so as to form a so-called disc-roll stand. A thrust ring 4, resting on a cylindrical fitting surface 2 of the roll shaft 1 and supported axially by a collar 3, supports the roll ring 5, consisting of brittle material, such as hard metal, axially and seals it off by means of a sealing ring 6. A conical surface 7, on which the taper sleeve 8 rests, adjoins the fitting surface 2 on the shaft. The taper sleeve 8 is supported on the conical surface 7 via annular projections 9,10 which are at an axial distance from one another. The outer surface of taper sleeve 8 forms annular projections 11,12 which rest against the cylindrical inner surface of the roll ring 5. The outside diameter of the annular projections 11,12 is calculated so that when relieved of stress the taper sleeve 8 has a slight play relative to the inside diameter of the roll ring 5. The outer annular projections 11,12 are offset axially relative to the inner annular projections 9,10, thereby establishing the spring effect of the taper sleeve 8.

The taper sleeve 8 has a sleeve part 13 which extends cylindrically in a straight line towards the free end of the roll shaft and has an end face 14 and an annular projection 15 which projects radially inwards and the inner periphery of which contains stop surface 57 and some axially extending grooves 16, the groove bottom of which is indicated by a broken line at 16. For example, there can be two grooves located diametrically opposite one another.

The conical surface 7 has adjoining it on the roll shaft two coaxial cylindrical stepped sliding surfaces 17, 18 surrounded by the piston part 21 which has coaxial cylindrical bores 19,20 corresponding in diameter to the sliding surfaces 17,18 and interacting with these, gaskets 24,25 being interposed. An annular space 22 is formed by the surfaces 18 and 19 and the radially extending surfaces which form respectively on the roll shaft 1 and on the piston part 21 the transition between the sliding surfaces 17,18 and the cylinder-bore surfaces 19,20. The annular space 22 can be subjected to a hydraulic medium through a bore 26 in the roll shaft 1, The pressure of the hydraulic medium forcing piston part 21 axially to the left. The piston part 21 has, at its end on the right in the drawing, a sleeve-shaped extension 27 which extends through the radially inner projection 15 of the taper sleeve 8 and which carries at the end engagement means 28 projecting outwards and corresponding in terms of shape and arrangement to the grooves 16. During assembly, therefore, the sleeve-shaped extension 27 can be pushed axially through the inner projection 15 of the taper sleeve, the engagement means 28 passing through the grooves 16, so that the engagement means 28 engage behind the inner projection 15 (on the right in the drawing). The two parts are subsequently rotated relative to one another a little, so that the engagement means 28 are moved away from the grooves 16. The piston part 21 and the taper sleeve 8 are secured in this position relative to one another by means of a pin 29. When the annular space 22 is subjected to a pressure medium, piston part 21 moves axially to the left in the drawing, and the engagement means 28 presses against stop surface 57 which causes taper sleeve 8 to move axially to the left with cylinder part 21. When taper sleeve 8 moves axially to the left, radial pressure against roll ring 5 by annular projections 11 and 12 is removed, thus allowing removal of roll ring 5. Adjoining piston surface 18 is a cylindrical surface 30, on which is fitted the bore 51 of an annular member 31. Annular piston 31 is secured against rotation by a spine 32 and against axial displacement by a shaft collar 52 and by an ring 34 mounted on the end of roll core 1 and held in place by nut 33. The annular member 31 is sealed off from the surface 30 by means of a gasket 35 and forms on its outer surface a sliding surface 36 which interacts with a cylinder bore 37 in an axial extension 38 of the piston part 21 and is sealed off by means of a sealing ring 39. An annular space 40 is formed by the surfaces 18 and 37 and by the associated end faces of the annular member 31 and of the piston part 21. When annular cylinder space 40 is subjected to a pressure medium through bore 41, pressure against cylinder part 21 causes piston part 21 to move axially to the right in the drawing.

The piston part 21 has, a flange 56 projecting outwards and having an side face 42 which is located axially opposite the end face 14 of the taper sleeve 8. A set of cup springs 43 is located between side face 42 and end face 14. For the purpose of dimensional adjustment, there is an intermediate ring 44, the axial dimension of which is chosen so that when the cup springs 43 are relaxed the piston part 21 can engage stop surface 57 by its engagement means 28 with a little play. A collar 45 made of elastomeric material is stretched round this arrangement and seals it off from the outside.

The axial extension 38 of the piston part 21 forms an end face 45 facing nut 47 which can be turned on the annular piston 31. The nut 47 forms abutment 58 and is connected to an axial cylindrical extension 48 which extends as a protective sleeve over and beyond the spring arrangement 43 and the taper sleeve 8 and which carries a sealing ring 49 at the end near the roll ring 5. The protective sleeve 48 is shown in one piece with the nut 47; however, it can also be a separate part sealed off from the nut 47 and/or the lefthand end of the piston part 21. If appropriate, the collar 45 can be omitted if the protective effect of the protective sleeve 48 is sufficient.

Outside the protective sleeve 48 there is a sliding sleeve 50 interacting with the protective sleeve 48 via bayonet projections 53,54,55 which secure these two parts axially relative to one another. In this position, the sliding sleeve 50 projects beyond the end of the protective sleeve 48 and the sealing ring 49.

When a roll ring 5 is assembled, the parts mentioned are first attached to the roll shaft 1 in the arrangement described and illustrated in the drawing. The nut 47 is then turned until the sliding sleeve 50 has pushed the roll ring 5 firmly up against the thrust ring 4. The annular space 40 is now subjected to pressure medium, causing piston part 21, to move axially to the right, which causes cup springs 43 to compress and press against the taper sleeve 8 and move it to the right of the drawing. The pressure of the pressure medium is calculated so that the taper sleeve and the cup springs acquire a predetermined prestress. The sliding sleeve 50 can now be removed, since the roll ring 5 is retained by the radial pressure of annular projections 11 and 12 caused by the taper sleeve 8 riding on surface 10. With the hydraulic pressure being maintained, the nut 47 is turned until abutment 58 comes firmly up against the end face 46 of the piston part 21 and thus fixes the cylinder part 21, the cup springs 43 and the taper sleeve 8 in the position previously brought about hydraulically. The hydraulic pressure can then be released. The length of the protective sleeve 48 is calculated so that, in this position, the lip of the sealing ring 49 comes sealingly up against the roll ring 5.

For the purpose of removal, the nut 47 is first unscrewed, if appropriate after it has been relieved beforehand by subjecting the annular space 40 to pressure. Annular space 22 is then subjected to hydraulic pressure, so that the piston part 21 moves axially to the left in the drawing, causing engagement means 28 to press against stop surface 57 which causes taper sleeve 8 to move axially to the left with cylinder part 21. As soon as this has occurred, after the nut 47 has been removed the roll ring 5 can be detached from the arrangement and replaced by a new roll ring. The taper sleeve 8, the piston part 21 and the annular member 31 as well as the cup springs 43 can remain in place. During removal and assembly, the sensitive spring arrangement is protected from dirt by the collar 45.

During operation, the roll shaft 1, which is under the effect of heat generated in the bearings, and the roll ring 5, which is stressed periodically by the hot billets to be rolled, are exposed to different thermal influences which lead to different axial expansions in these parts and in the elements located between them. Other temperatures and expansion conditions prevail, in turn, in the state of rest. Although these can result in a change in the clamping length of the cup springs 43 and consequently also in differences in the spring force exerted by the spring on the taper sleeve 8, nevertheless the spring is designed so that these differences in spring force are much less than the frictional forces prevailing between the taper sleeve 8 and the cone 7 of the roll shaft, so that no relative movements can be caused as result.

The force of the cup springs 43 is calculated so that there arise between the conical surface 7, the taper sleeve 8 and the roll ring 5 conditions of friction which suffice with ample certainty to transmit the torque occurring in the rolling operation. It has been shown, surprisingly, that in the arrangement according to the invention the roll ring 5 does not tend to creep in a peripheral direction relative to the roll shaft 1, whereas in the arrangement in most common use hitherto, with rigid cone bracing, in which a cone angle below the self-locking angle is adopted, creeping can scarcely be prevented even by means of substantially stronger radial bracing.

I claim:

1. Apparatus for fastening a roll ring on an overhung roll shaft comprising:
   A. a roll shaft having a tapered surface and a sliding surface adjacent the tapered surface;
   B. a generally annular piston part surrounding the roll shaft and having an inner surface in bearing contact with the sliding surface of the roll shaft;
   C. a generally annular taper sleeve surrounding the roll shaft adjacent the piston part and having a radially resilient portion incuding a first sleeve surface in bearing contact with the tapered surface of the roll shaft and a second sleeve surface for contacting an inner surface of the roll ring;
   D. means for moving the piston part in a first axial direction along the roll shaft; and
   E. means for coupling the first axial movement of the piston part to the taper sleeve so that movement of the radially resilient portion of the taper sleeve in the first axial direction along the tapered surface of the roll shaft radially expands the resilient portion and imparts radial force to the roll ring.

2. Apparatus as in claim 1 further comprising:
   A. means for moving the piston part in a second axial direction; and
   B. means for coupling the second axial movement of the piston part to the taper sleeve so that movement of the radially resilient portion of the taper sleeve in the second axial direction along the tapered surface of the roll shaft allows radial contraction of the resilient portion and removes radial force from the roll ring.

3. Apparatus as in claim 1 further comprising means for maintaining the radial force imparted to the roll ring.

4. Apparatus as in claim 3 wherein the piston part includes a piston face facing toward a free end of the roll shaft and wherein the force maintaining means comprises:
   an annular member having an abutment; and
   means for coupling the annular member to the roll shaft, the roll shaft being disposed coaxially within the annular member, the abutment generally aligning with the piston face, and the annular member being adjustable in the first axial direction along the roll shaft so that the abutment abuts against the piston face when the annular member is adjusted in the first axial direction and biases the piston part in the first axial direction.

5. Apparatus for fastening a roll ring on an overhung roll shaft comprising:
   A. a roll shaft including;
      (i) a tapered surface,
      (ii) a first sliding surface adjacent the tapered surface, and
      (iii) a second sliding surface adjacent the first sliding surface, the second sliding surface being circumferentially different from the first sliding surface for forming a first annular surface at a junction thereof;
      (iv) means, adjacent the second sliding surface, for forming a third sliding surface, the third sliding surface being circumferentially different from the second sliding surface for forming a second annular surface at a junction thereof;
   B. a generally annular piston part surrounding the roll shaft including:
      (i) a first piston surface in bearing contact with the first sliding surface,
      (ii) a second piston surface adjacent the first piston surface and in bearing contact with the second sliding surface, the first and second piston surfaces forming a third annular surface at a junction thereof, and
      (iii) a third piston surface adjacent the second piston surface and in bearing contact with the third sliding surface, the second and third piston surfaces forming a fourth annular surface at a junction thereof,
      wherein a portion of the third piston surface forms with a portion of the second sliding surface and the second and fourth annular surfaces at first annular space, and
      wherein a portion of the first piston surface forms with a portion of the second sliding surface and the first and third annular surfaces a second annular space;
   C. means for flowing a fluid into the first annular space, the piston part moving in a first axial direction when fluid flows into the first annular space;
   D. means for flowing a fluid into the second annular spasce, the piston part moving in a second axial direction when fluid flows into the second annular space;
   E. a generally annular taper sleeve surrounding the roll shaft adjacent the piston part and having a radially resilient portion including:
      (i) a first sleeve surface in bearing contact with the tapered surface of the roll shaft,
      (ii) a second sleeve surface radially opposite the first sleeve surface for contacting an inner surface of the roll ring; and
   F. means for coupling the movement of the piston part in the first axial direction to the taper sleeve so that movement of the radially resilient taper sleeve in the first axial direction along the tapered surface of the roll shaft radially expands the resilient portion and imparts radial force to the roll ring.

6. Apparatus as in claim 5 wherein the second sliding surface is smaller than the first sliding surface, and the third sliding surface is larger than the second sliding surface.

7. Apparatus as in claim 5 wherein the second sliding surface is larger than the first sliding surface, and the third sliding surface is smaller than the second sliding surface.

8. Apparatus as in claim 5 further comprising means for coupling the second axial movement of the piston part to the taper sleeve so that movement of the radially resilient portion of the taper sleeve in the second axial direction along the tapered surface of the roll shaft allows radial contraction of the resilient portion and removes radial force from the roll ring.

9. Apparatus as in claim 5 further comprising means for maintaining the radial force imparted to the roll ring.

10. Apparatus as in claim 9 wherein the piston part includes a piston face facing toward a free end of the roll shaft, and wherein the force maintaining means comprises an annular member having an inner surface disposed around the roll shaft and an abutment generally aligning with the piston face, the annular member being adjustable in the first axial direction of the roll shaft so that the abutment abuts against the piston face when the annular member is adjusted in the first axial direction and biases the piston part in the first axial direction.

11. Apparatus as in claim 10 wherein the inner surface of the annular member threadingly engages with the third sliding surface forming means, and wherein the piston face is adjacent the third piston surface.

12. Apparatus as in claim 1 or 5 wherein the first movement coupling means comprises a spring disposed between an abutment facing the taper sleeve on the piston part and an abutment on the taper sleeve opposite the piston part element.

13. Apparatus as in claim 2 or 8 wherein the second movement coupling means comprises:
   a taper sleeve projection extending radially from the taper sleeve; and
   a piston part projection extending radially from the piston part for coupling with the taper sleeve projection when the piston part moves in the second axial direction.

14. Apparatus as in claim 12 wherein all portions of the taper sleeve, the spring, and the piston part disposed on a free side of the roll ring have a maximum outside diameter not exceeding a smallest inside diameter of the roll ring.

15. Apparatus as in claim 12 wherein the taper sleeve, the spring, and the piston part are surrounded by a collar having an outside diameter less than an inside diameter of the roll ring.

16. Apparatus as in claim 3 or 9 further comprising a protective sleeve having opposite ends and surrounding the piston part and the taper sleeve, one end of the protective sleeve sealingly adjoining the roll ring and the other end of the protective sleeve sealingly adjoining the force maintaining means.

17. Apparatus as in claim 16 wherein the protective sleeve and the force maintaining means are constructed as one piece.

18. Apparatus as in claim 16 further comprising means, connected to the protective sleeve, for setting an initial position of the roll ring.

19. Apparatus as in claim 18 wherein the setting means comprises a pilot sleeve removeably surrounding the protective sleeve and extending beyond the protective sleeve for initially positioning the roll ring.

20. Apparatus as in claim 1 or 5 wherein an angle of the first sleeve surface is above a self-locking angle.

21. Apparatus as in claim 12 further comprising means for maintaining a compressive force of the spring below a frictional force between the first sleeve surface and the tapered surface of the roll shaft.

* * * * *